United States Patent [19]
Bernard, Jr.

[11] 3,779,149
[45] Dec. 18, 1973

[54] VENTILATOR DEVICE

[76] Inventor: John E. Bernard, Jr., 1804 Skycoe Dr., Salem, Va. 24153

[22] Filed: July 26, 1972

[21] Appl. No.: 275,346

[52] U.S. Cl. ............ 98/2.16, 98/2.17, 98/2.18, 98/37, 114/211
[51] Int. Cl. .............................. B60h 1/30
[58] Field of Search ............... 98/2, 2.14, 2.15, 98/2.16, 2.17, 2.18, 2.19, 37, 64; 114/211

[56] References Cited
UNITED STATES PATENTS

| | | | |
|---|---|---|---|
| 3,062,125 | 11/1962 | Henneberger | 98/62 X |
| 2,550,353 | 4/1951 | Hopfinger | 98/2.14 |
| 2,839,986 | 6/1958 | Herman | 98/37 |
| 2,885,941 | 5/1959 | Allen | 98/2.17 X |
| 2,939,375 | 6/1960 | Herman | 98/2.14 X |
| 3,112,687 | 12/1963 | Henneberger | 98/64 X |
| 3,311,043 | 3/1967 | Atkinson | 98/37 |

*Primary Examiner*—William F. O'Dea
*Assistant Examiner*—Peter D. Ferguson
*Attorney*—John B. Sponsler

[57] ABSTRACT

A ventilator device in the form of a half dome having an open, screened face surmounting a sloping header with an internal, hinged entrance located below the header and a slotted U-tube having dual funnel shaped intakes facing in the direction of the screened face, the slotted U-tube enabling air forced therein via the funnel intakes to disperse moisture within the device to be exhausted other than through the air passageway over which the ventilator device is mounted with an opening in a vehicle to be ventilated. The ventilator device may be molded or otherwise formed, and the material of which it is made may be opaque or translucent - in the latter case providing illumination from daylight sources as well as ventilation.

1 Claim, 4 Drawing Figures

PATENTED DEC 18 1973

3,779,149

VENTILATOR DEVICE

BACKGROUND OF THE INVENTION

Ventilation for vehicles used in commerce is a requirement in such devices as trucks, trailers, boats and the like where more elaborate systems of air cooling are not installed. In many instances ventilation is not only for the convenience and comfort of the operators of these vehicles, but also for the safety of the cargo being carried. Many ventilating devices have been adapted to the aforementioned vehicles; however, most of these devices require complex and costly installation.

SUMMARY OF THE INVENTION

The present invention is directed to a ventilator device of simple construction and installation, a device which can be mounted upon a vehicular body with little difficulty and which has unique features of use whereby air is forced into the ventilator device by motion of the vehicle upon which it is installed and simultaneously providing means for discharging water forced into the device under abnormal conditions of rain and the like. The design of the ventilator device is such that it can be mounted either as a single ventilator, in parallel, or in tandem with another ventilator device; e.g., a ventilator device at each end of a vehicle.

DETAILED DESCRIPTION OF THE INVENTION

Figure 1:
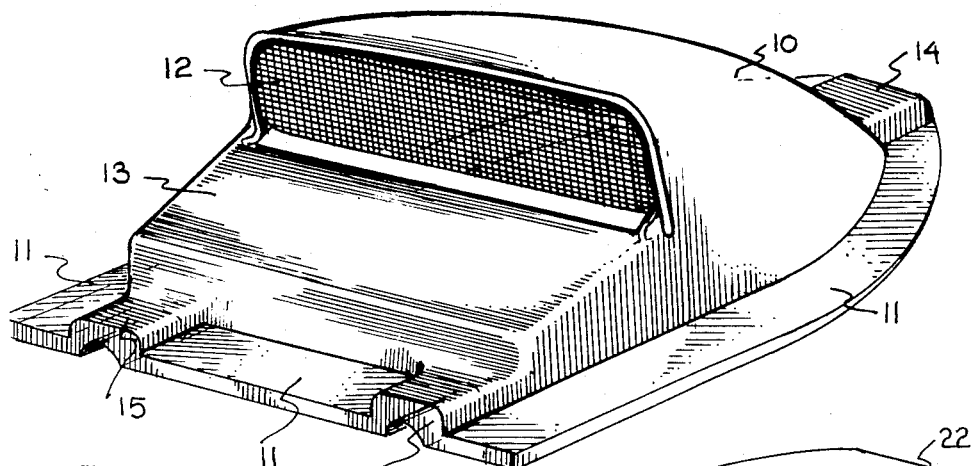
FIG. 1 is a perspective view of the upper half of the subject ventilator device.

Referring to FIG. 1 there is shown the upper half of the dome-like ventilator device having a bubble or dome 10 rising from a rim 11, the dome 10 being intersected by a screen covered opening 12 surmounting a sloping portion 13 over which air flows into and through the opening 12. As shown in FIG. 1 the front rim 11 includes two (2) partial openings 15 and the rear rim 11 includes a single partial opening 14.

Figure 2:
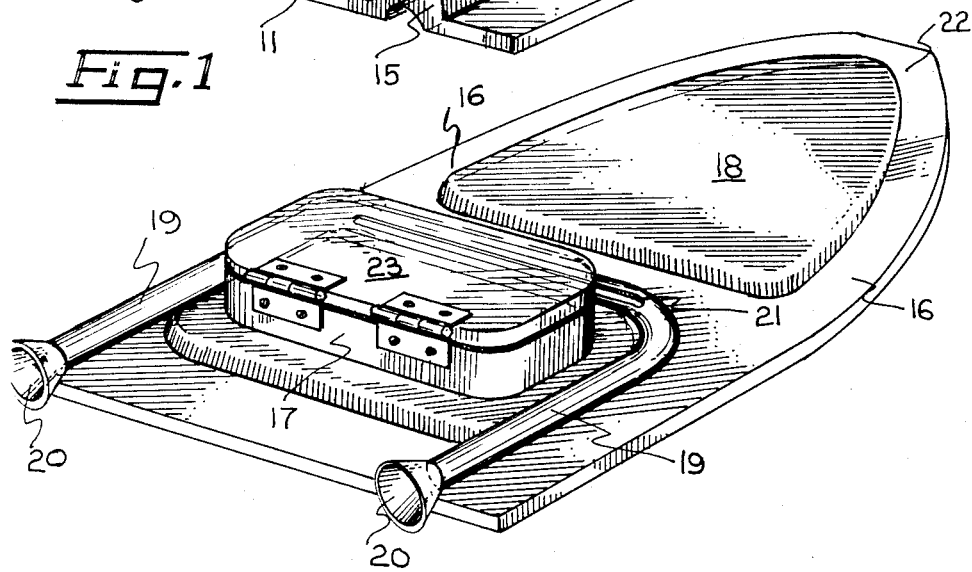
FIG. 2 is a similar view of the lower half of the subject ventilator device illustatrating its novel air dispensing feature.

The ventilator device is further described by reference to FIG. 2 representing the lower half of the device and having a planar shape coinciding with the upper half of the device shown by FIG. 1. In FIG. 2 a rim 16 is provided that is commensureate with the rim 11 of FIG. 1 whereby the upper and lower halves of the ventilator device are fastened together by bolts or the like (not shown) or by suitable adhesives. The lower half of the device (FIG. 2) includes a raised wall 17 surrounding the opening in the lower half through which air is passed into the vehicle to which the ventilator device is attached via an opening in the vehicle — the ventilator device being fastened to the vehicle by the aforementioned bolts passing through the rims 11 and 16. Covering the raised wall 17 is a hinged lid 23 which can be adjusted for regulating the amount of air pasing through the lower half opening by a handle (not shown) having graduated, detented steps, for example. The rear end of the lower half as shown in FIG. 2 includes a flat, depressed portion 18 together with a flattened portion 22 which cooperates with small opening 14 to permit water coming into the device to be exhausted along the top of the vehicle to which the device is attached.

As viewed in FIG. 2 the front end of the device holds a U-tube 19 having funnels 20 at each end and a slotted opening 21 in the base of the U-tube for discharging air and water into the interior of the device thereby dispersing any water which accumulates (during rainy weather) around the wall 17, the depressed portion 18 and the interior of the device by air forced in through the U-tube funnels 20, which are held clamped between the lower half of the device and the upper half in the partial openings 15.

Figures 3, 4:
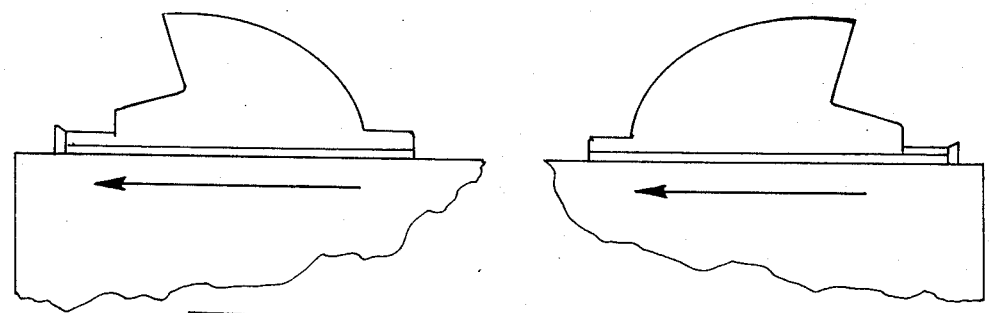
FIG. 3 is a line diagram showing the manner of installing the ventilator device upon the top of a vehicle.
FIG. 4 is similar to FIG. 3, showing another manner of installing the ventilator device.

FIG. 3 illustrates the operation of the ventilator device when attached to the front end of a moving vehicle wherein air (and water — during rain storms) is forced through the opening 12 into the interior of the device, the ventilating air being drawn through the hinged lid 23 into the vehicle's interior and any water being blocked by the wall 17 and exhausted from the opening 14, aided by the force of air forced through the funnels 20, the U-tube 19 and the slotted opening 21.

FIG. 4 illustrates the operation of the ventilator device when attached to the rear of a moving vehicle wherein the design of the domed device causes an area of lower pressure at the opening 12 whereby air is forced from the ventilator device whenever the vehicle is moving.

What is claimed is:

1. A ventilator device for mounting over an opening in a moving vehicle comprising a half-dome shaped, flanged, upper member and a substantially flat, lower member juxtaposed symmetrically thereon and joined therewith, a screened opening in said upper member for admitting forced air into said device, an opening in said lower member for exhausting air from said device, a walled enclosure around said lower opening for preventing water forced into said upper opening from escaping through said lower opening, a funnel-ended U-tube surrounding said enclosure having its funnel ends extending outside said device and facing with said upper opening, and an opening in the base of said U-tube for dispersing air into said device to agitate water accumulating in said device.

* * * * *